United States Patent [19]
Cheek et al.

[11] 3,728,616
[45] Apr. 17, 1973

[54] CONTINUITY TESTING APPARATUS UTILIZING A PLURALITY OF PAIRED RESISTORS

[75] Inventors: Howard L. Cheek, Howard V. May, both of Winston-Salem, N.C.

[73] Assignee: Western Electric Company, Incorporated, New York, N.Y.

[22] Filed: Feb. 2, 1971

[21] Appl. No.: 111,960

[52] U.S. Cl. ........................324/51, 324/66, 324/73
[51] Int. Cl. ..............................................G01r 31/02
[58] Field of Search......................324/51, 52, 54, 66, 324/73

[56] References Cited

UNITED STATES PATENTS

| | | | |
|---|---|---|---|
| 3,333,186 | 7/1967 | Mowery | 324/51 |
| 2,582,499 | 1/1952 | Messerschmidt | 324/73 R X |
| 1,977,703 | 10/1934 | Swartwout | 324/73 R |

FOREIGN PATENTS OR APPLICATIONS

| | | | |
|---|---|---|---|
| 924,432 | 4/1963 | Great Britain | 324/66 |

Primary Examiner—Gerard R. Strecker
Attorney—W. M. Kain, R. P. Miller and W. L. Williamson

[57] ABSTRACT

An apparatus tests for wiring errors in connections between a plurality of pairs of terminals. The apparatus includes a plurality of pairs of matched resistors with one pair of terminals connected between each respective pair of resistors across a voltage source. The voltage across one of each pair of resistors is sensed to determine a voltage above or below a predetermined range of voltages to indicate a defectively wired circuit. Each pair of resistors has matched resistors with values differing sufficiently from every other pair of resistors to operate the voltage sensing facilities in the event there are crossed or erroneous connections.

6 Claims, 4 Drawing Figures

CONTINUITY TESTING APPARATUS UTILIZING A PLURALITY OF PAIRED RESISTORS

BACKGROUND OF THE INVENTION

1. Field of the Invention

In the manufacture of electronic equipment, such as telephone equipment, data handling equipment, receivers, amplifiers, etc., numerous wired electrical connections are often made between various points or terminals of a unit being manufactured. It is desirable to check for continuity of these wired connections or for crossed or erroneous connections to determine that the unit has been properly wired.

2. Prior Art

The prior art apparatus can generally be divided into two groups. The first group of prior art apparatus includes manually operated apparatus which requires many time consuming manual operations to test a large number of circuits. The second group of prior art apparatus utilizes complex automatic switching circuits which sequentially connect every possible pair of terminals to testing circuits to sense defective connections. While the second group of prior art apparatus is reliable and can be practical for large production runs of a particular unit, less expensive testing apparatus is desired for units produced in smaller quantities.

SUMMARY OF THE INVENTION

An object of the present invention is an apparatus for testing for continuity and erroneous connections of a plurality of wired connections.

Another object of the present invention is an apparatus which is inexpensive and which requires few manual operations by an operator to determine continuity and wiring errors among a plurality of wired connections.

In accordance with these and other objects, an embodiment of the present invention utilizes a plurality of pairs of matched resistors with the relative values of resistors in each pair having a predetermined ratio. In addition, each pair of matched resistors have values which differ by more than a predetermined percent from the values of every other pair of resistors. Suitable facilities connect opposite ends or terminals of a respective wire connection between each pair of resistors. Each pair of resistors and its interposed connection under test is connected across a voltage source to produce a predetermined voltage drop across a selected one of each pair of resistors. Any voltage across one of each pair of resistors which is above or below the predetermined voltage is sensed to indicate a defective connection.

Another feature of the invention is that detecting circuitry connected across the selected one of each pair of resistors senses voltages outside of a predetermined range of voltages to indicate defective circuits.

DETAILED DESCRIPTION

Figure 1:
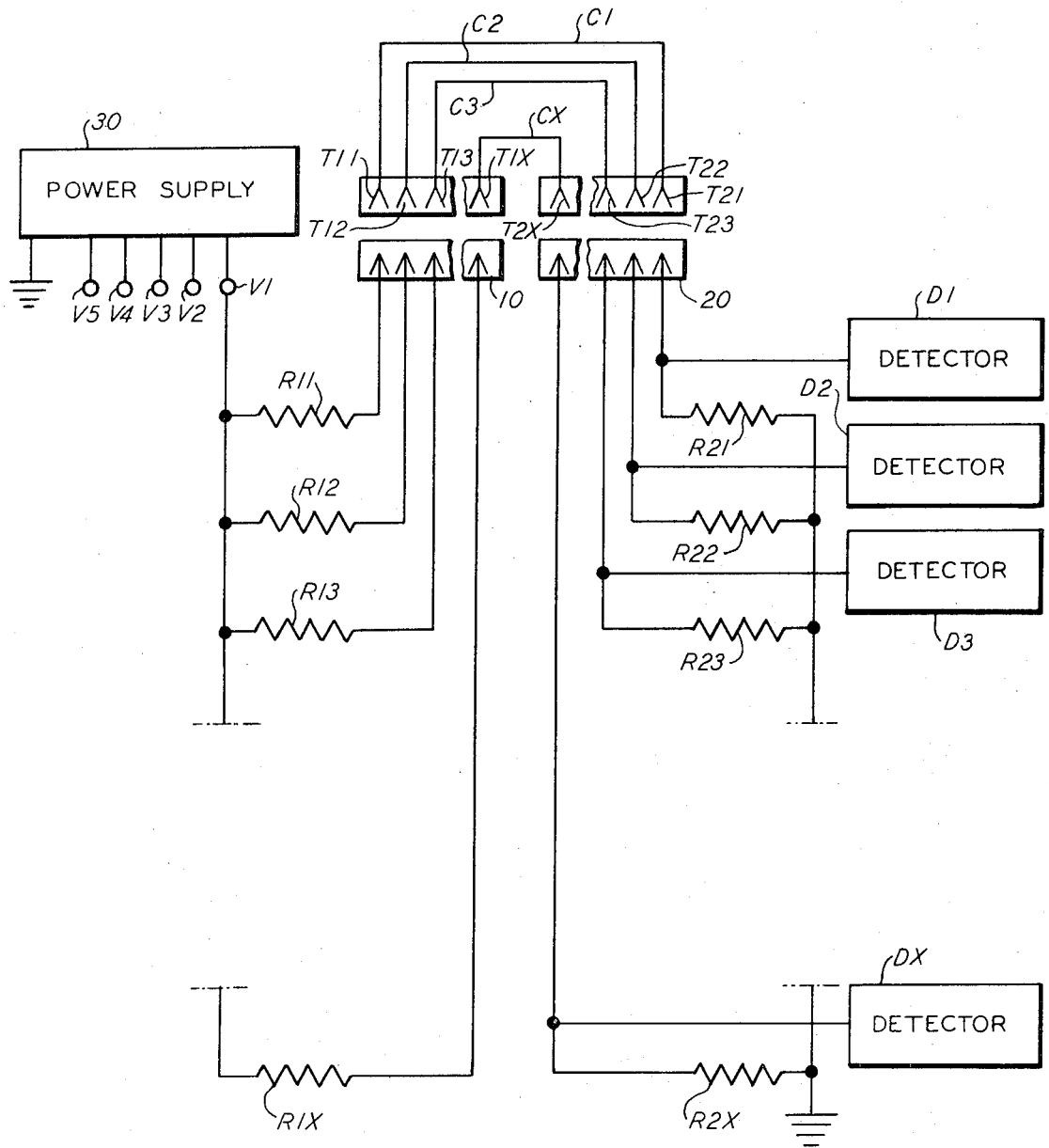
FIG. 1 shows an apparatus for testing continuity of a plurality of connections under test in accordance with the principles of the invention.

Referring to FIG. 1, there is shown an apparatus for testing for errors in wired connections C1, C2, C3, . . . CX made between respective points or terminals T11, T12, T13, . . . T1X and T21, T22, T23, . . . T2X. The errors sensed by the apparatus includes (1) missing connections; (2) crossed connections, for example T11 connected to T22 and T12 connected to T21 instead of the connections shown in FIG. 1; (3) erroneous connections, for example T11 connected to T22 instead of to T21 as shown in FIG. 1; and (4) high resistance connections such as those caused by bad solder joints, loose wrapped wires, etc. The terminals T11–T1X and T21–T2X are connected to the testing apparatus by suitable connectors 10 and 20. The connectors 10 and 20 may be a single device or many devices which are capable of making an electrical contact with the points or terminals T11–T1X and T21–T2X. Conveniently, the terminals T11–T1X and T21–T2X may be arranged or connected to one or more terminal arrays or connectors so that the operator may easily connect the testing apparatus to the connections under test.

Figure 2:
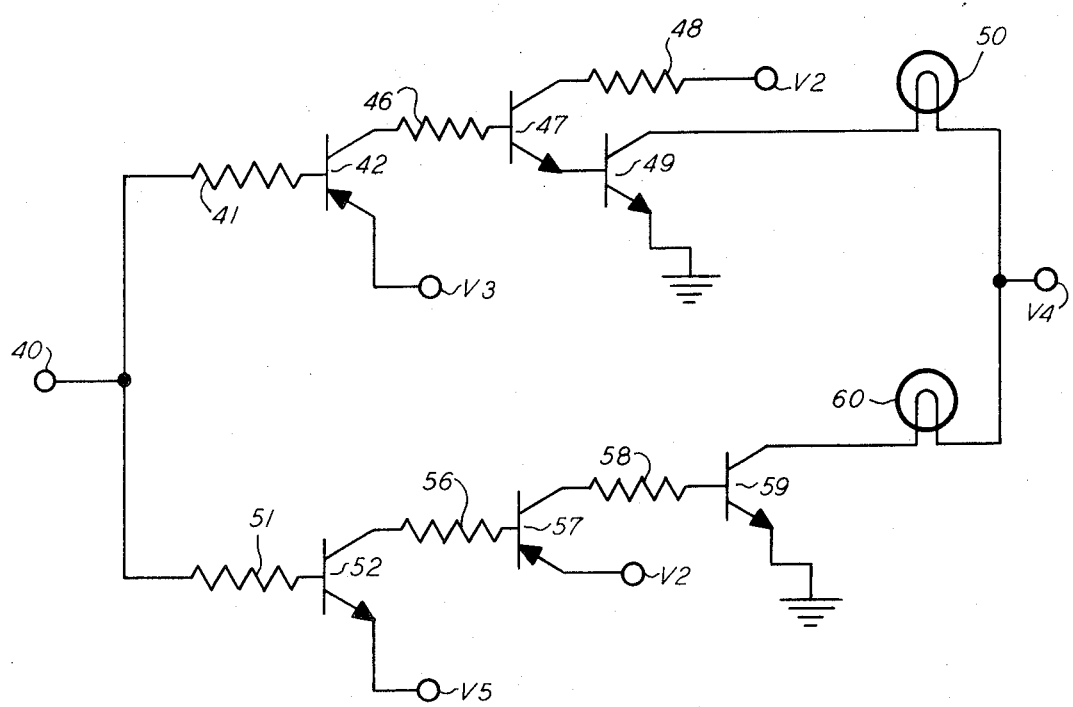
FIG. 2 is a detailed sketch of a detector circuit suitable for use in the apparatus of FIG. 1.

The apparatus includes a power supply 30 with a ground or common terminal and five outputs V1, V2, V3, V4, and V5. Hereinafter throughout this description V1, V2, V3, V4, and V5 may be referred to either as outputs or D. C. voltages which appear on the outputs. The power supply 30 may be one or a plurality of units or circuits designed to produce the output voltages V1-V5. Such units or circuits are conventional and are not described herein. An example of voltages selected for silicon transistors used in the detector circuit of FIG. 2 are $V1 = 12$ volts; $V2 = 8$ volts; $V3 = 6.3$ volts; $V4 = 6$ volts; and $V5 = 5.7$ volts.

Resistors R11, R12, R13, . . . R1X are connected in parallel between the connector 10 and the output V1 of the power supply 30 such that upon engagement of the connector 10 with the terminals T11–T1X, the resistors R11–R1X are connected in series with the respective connections C1–CX. Similarly, resistors R21, R22, R23, . . . R2X are connected in parallel between the connector 20 and ground such that upon engagement of the contactor 20 with the terminals T21–T2X, the resistors R21–R2X are connected in series with the respective connections C1–CX. The two resistors connected to each of the connections C1–CX make up a pair of resistors; that is, R11 and R21 are a pair, R12 and R22 are a pair, R13 and R23 are a pair, and R1X and R2X are a pair. Each pair of resistors is matched to give a predetermined voltage drop across the resistors R21–R2X; for example, R11 and R21 may be equal so that one-half the voltage V1 appears across the resistor R21, or R11 may be one-half of the value of R21 so that two-thirds the voltage V1 appears across the resistor R21. Each of the resistors R11, R12, R13, . . . R1X are selected to have values which differ from each other by at least a predetermined percent, for example, at least 18 percent, such that crossed connections or erroneous connections will not produce the predetermined voltage drop across one of the resistors R21-R2X. Also, the values of the resistors R21, R22, R23, . . . R2X are selected to have different values with the same percent difference as the resistors R11, R12, R13, . . . R1X.

Detectors D1, D2, D3, . . . DX are connected across the respective resistors R21, R22, R23, . . . R2X to sense any voltage across the resistors R21-R2X which is above or below the predetermined voltage to indicate an error in the connection C1-CX. To allow for small variations in resistor values and in connection resistances, the detectors D1-DX sense only voltages which are outside of a selected tolerance range of voltages around the predetermined voltage. The tolerance range of voltages of the detectors, the tolerance variation of the resistors R11-R1X and R21-R2X and the predetermined percent difference in value of resistors R11-R1X are all mutually dependent factors to be considered in selecting the values and tolerances of particular components.

Referring to FIG. 2 there is shown a detailed circuit which is employed in the detectors D1-DX of FIG. 1. The detector circuit has an input 40 connected by a resistor 41 to the base of a PNP transistor 42. The emitter of the transistor 42 is connected to the output V3 of the power supply 30 (FIG. 1) such that when the voltage on input 40 drops a predetermined amount below the voltage V3 the transistor 42 is rendered conductive. The collector of the transistor 42 is connected by resistor 46 to the base of a NPN transistor 47 which has a collector connected by a resistor 48 to the output V2. The emitter of the transistor 47 is connected to the base of a NPN transistor 49 having a collector-emitter circuit connected in series with a lamp 50 across the output V4. Thus, when the voltage across one of the resistors R21-R2X applied to the input 40 drops below the lower limit of the selected tolerance range of voltages (voltage V3 minus emitter-base voltage minus tolerance voltage) the transistors 42, 47 and 49 are rendered conductive to light the lamp 50 to indicate a defective connection.

Similarly, the input 40 is connected by a resistor 51 to the base of a NPN transistor 52. The emitter of the transistor 52 is connected to the output V5 such that the transistor 52 becomes conductive when the voltage on input 40 raises a predetermined amount above the voltage V5. The collector of the transistor 52 is connected by a resistor 56 to the base of a PNP transistor 57 which has its emitter connected to the output V2. The resistor 58 connects the collector of the transistor 57 to the base of a NPN transistor 59. The collector-emitter circuit of the transistor 59 is connected in series with a lamp across the output V4. Thus, when the voltage across one of the resistors R21-R2X applied to the input 40 rises above the upper limit of the selected tolerance range of voltages (voltage V5 plus emitter-base voltage plus tolerance voltage) the transistors 52, 57 and 59 become conductive to indicate a defective connection.

Figure 3:
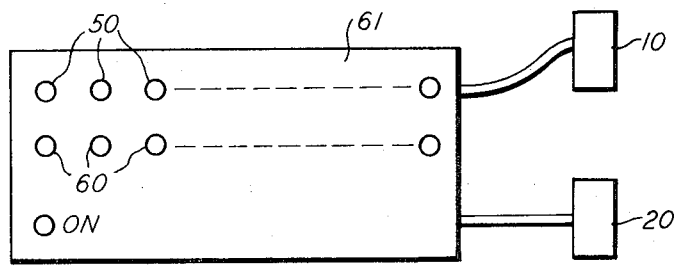
FIG. 3 shows the front of a chassis containing the circuitry of FIG. 1 with lights displayed to indicate erroneous connections in a plurality of connections under test.

Referring to FIG. 3, there is shown a chassis 61 supporting the circuitry shown in FIG. 1 with a plurality of lamps 50—50 in an upper row thereacross and a plurality of lamps 60—60 in a lower row thereacross. The lamps 50—50 and 60—60 when illuminated indicate erroneous connections to an operator who then can correct the connections. The position of the lamp from left to right indicates particular connections. The operator may also determine possible types of wiring errors to look for; for example, a missing connection would illuminate only one of the lamps 50—50, or crossed connections would illuminate one of the lamps 50—50 and one of the lamps 60—60.

Figure 4:
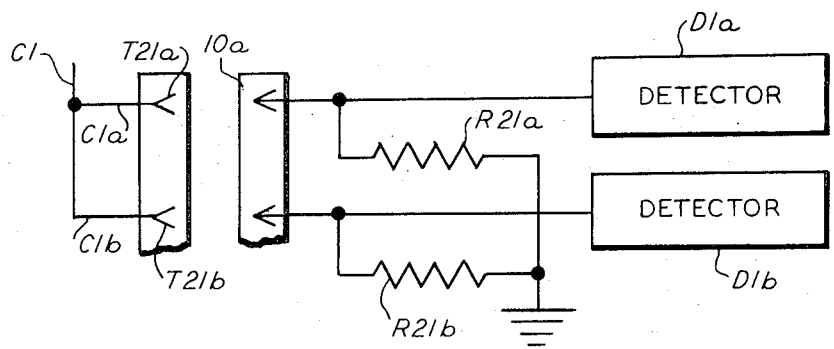
FIG. 4 shows a modification of the apparatus shown in FIG. 1.

Referring to FIG. 4, there is shown a modification of the apparatus shown in FIG. 1 to test connections wherein the connection C1 has two branches C1a and C1b connected to terminals T21a and T21b. Each of the terminals T21a and T21b are connected by a connector 10a to respective resistors R21a and R21b to ground. The voltages across the resistors R21a and R21b are sensed by detectors D1a and D1b in a manner similar to FIG. 1. The resistors R21a and R21b have values selected to produce a parallel combination value substantially equal to R21 of FIG. 1.

The above-described embodiments of the invention are simply illustrative of the principles of the invention and many embodiments may be devised without departing from the scope and spirit of the invention.

What is claimed is:

1. An apparatus for detecting an erroneous condition in a first connection between first and second terminals and in a second connection between third and fourth terminals, comprising:

means for supplying a predetermined voltage:

first, second, third and fourth resistances, said first and second resistances having relative values with a predetermined ratio, said third and fourth resistances having relative values with said predetermined ratio, said first and third resistances having respective values which differ by at least a predetermined percent;

means for connecting the first and second resistances in series with the first and second terminals across the voltage supplying means and for connecting the third and fourth resistances in series with the third and fourth terminals across the voltage supplying means, said first and second terminals being interposed between said first and second resistances and said third and fourth terminals being interposed between said third and fourth resistances; and means sensing the voltage across one of the first and second resistances and across one of the third and fourth resistances for detecting the erroneous condition.

2. An apparatus for testing for errors in a plurality of connections between a corresponding plurality of pairs of terminals, comprising:

means for supplying a predetermined voltage;

means for electrically contacting the plurality of pairs of terminals;

a plurality of pairs of resistances corresponding to the plurality of connections to be tested, each pair of resistances connected in series with a corresponding pair of terminals across said voltage supplying means such that each pair of terminals is interposed between first and second resistances of each corresponding pair of resistances;

the first and second resistances of each pair of resistances having values with the same predetermined ratio;

the first resistance of each pair of resistances having a value which differs from the value of every other first resistance by more than a predetermined percent; and means sensing voltages across one of said first and second resistances of each pair of resistances for detecting errors.

3. An apparatus as defined in claim 2 wherein the detecting means includes:

first means operated by a voltage above a predetermined range of voltages for indicating a first error condition; and second means operated by a voltage below the predetermined range of voltages for indicating a second error condition.

4. An apparatus as defined in claim 2 wherein the detecting means includes:

a plurality of first means connected across respective ones of said first and second resistances and operated by voltages above a predetermined range of voltages for indicating first error conditions; and a plurality of second means connected across respective ones of said first and second resistances and operated by voltages below a predetermined range of voltages for indicating second error conditions.

5. An apparatus as defined in claim 4 wherein:

each of the first means includes a first indicating device and first gating means operated by voltages above the predetermined range of voltages for actuating the first indicating device; and each of the second means includes a second indicating device and second gating means operated by voltages below the predetermined range of voltages for actuating the second indicating device.

6. Apparatus as defined in claim 2 wherein the first resistance of each pair of resistances has a value which differs from the value of every other first resistance by more than 18 percent.

* * * * *